(12) United States Patent
Schnabel et al.

(10) Patent No.: US 11,895,241 B2
(45) Date of Patent: Feb. 6, 2024

(54) DRIVER ASSISTANCE APPARATUS AND METHOD

(71) Applicant: VEONEER SWEDEN AB, Vargarda (SE)

(72) Inventors: Jochen Schnabel, Vargarda (SE); Olaf Schwartz, Vargarda (SE); Jonas Villasmil, Vargarda (SE)

(73) Assignee: VEONEER SWEDEN AB, Vargarda (SE)

( * ) Notice: Subject to any disclaimer, the term of this patent is extended or adjusted under 35 U.S.C. 154(b) by 86 days.

(21) Appl. No.: 16/639,006

(22) PCT Filed: Aug. 14, 2018

(86) PCT No.: PCT/EP2018/072023
§ 371 (c)(1),
(2) Date: Feb. 13, 2020

(87) PCT Pub. No.: WO2019/034652
PCT Pub. Date: Feb. 21, 2019

(65) Prior Publication Data
US 2020/0213126 A1   Jul. 2, 2020

(30) Foreign Application Priority Data
Aug. 16, 2017   (EP) ................................. 17186405

(51) Int. Cl.
*H04L 9/32*   (2006.01)
*G06F 21/51*   (2013.01)
(Continued)

(52) U.S. Cl.
CPC ............ *H04L 9/3239* (2013.01); *G06F 21/51* (2013.01); *G06F 21/57* (2013.01); *G06F 21/64* (2013.01);
(Continued)

(58) Field of Classification Search
CPC ............... H04L 9/3239; H04L 2209/38; H04L 2209/84; H04L 67/12; H04L 63/1466;
(Continued)

(56) References Cited

U.S. PATENT DOCUMENTS 7,026,918 B2 *  4/2006  Briick ................... B60R 25/102
                                                           180/287
7,388,465 B2 *  6/2008  Simon ..................... G07F 17/24
                                                            340/5.31
(Continued)

FOREIGN PATENT DOCUMENTS

JP   2012048488 A   3/2012

OTHER PUBLICATIONS

Oguma, Hisashi, et al., "New Attestation-Based Security Architecture for In-vehicle Communication", 2008 IEEE Global Telecommunications Conference: [IEEE Globecom 2008]; New Orleans, Louisiana, Nov. 30, 2008-Dec. 4, 2008, IEEE, Piscataway, NJ, USA, Nov. 30, 2008 (Nov. 30, 2008), pp. 1-6, XP031370052, ISBN: 978-4244-2324-8.

(Continued)

*Primary Examiner* — Thaddeus J Plecha
*Assistant Examiner* — Blake I Narramore
(74) *Attorney, Agent, or Firm* — DICKINSON WRIGHT PLLC

(57) ABSTRACT

A driver assistance apparatus and method for a driver assistance apparatus for verifying the safe operation of the apparatus. It is important to verify that operating instructions that dictate the operation of a driver assistance system are verified. The apparatus includes a safety electronic control unit and the safety electronic control unit includes operating instructions stored thereon that dictate the operation of the safety electronic control unit. The safety electronic control unit further includes a verified hash storage for storing a (Continued)

verified hash value of at least a portion of the operating instructions. The safety electronic control unit is configured to implement a verification routine, which includes calculating, using a hash function, a test hash value of the at least a portion of the operating instructions; comparing the test hash value with the verified hash value, and if the test hash value is not equal to the verified hash value, performing a safety routine.

10 Claims, 5 Drawing Sheets

(51) Int. Cl.
| | | |
|---|---|---|
| *G06F 21/57* | (2013.01) | |
| *G06F 21/64* | (2013.01) | |
| *G07C 5/00* | (2006.01) | |
| *G07C 5/08* | (2006.01) | |
| *H04L 9/00* | (2022.01) | |

(52) U.S. Cl.
CPC .............. *G07C 5/008* (2013.01); *G07C 5/085* (2013.01); *H04L 9/50* (2022.05); *H04L 2209/84* (2013.01)

(58) Field of Classification Search
CPC ....... H04L 63/123; G06F 21/51; G06F 21/57; G06F 21/64; G07C 5/008; G07C 5/085
See application file for complete search history.

(56) References Cited

U.S. PATENT DOCUMENTS

| | | | | |
|---|---|---|---|---|
| 9,269,203 | B2 * | 2/2016 | Peirce ................... | G07C 5/085 |
| 2005/0179546 | A1 * | 8/2005 | Lanigan ................. | G08B 25/14 340/545.6 |
| 2005/0190619 | A1 * | 9/2005 | Wakiyama ............... | G11C 7/24 365/201 |
| 2006/0053278 | A1 * | 3/2006 | Tanimoto .............. | H04L 63/123 713/150 |
| 2007/0268117 | A1 * | 11/2007 | Moffett .................... | B62H 5/20 340/426.2 |
| 2010/0306545 | A1 * | 12/2010 | Seki ..................... | H04L 63/0823 709/206 |
| 2011/0138188 | A1 * | 6/2011 | Lee .......................... | G06F 21/57 713/187 |
| 2013/0301829 | A1 * | 11/2013 | Kawamura ........... | H04L 9/0869 380/44 |
| 2014/0232521 | A1 * | 8/2014 | Kawamura ......... | G07C 9/00896 340/5.26 |
| 2014/0245017 | A1 * | 8/2014 | Hardinge .............. | H04L 9/0825 713/171 |
| 2017/0139795 | A1 * | 5/2017 | Komano ............. | H04L 63/1425 |
| 2018/0004964 | A1 * | 1/2018 | Litichever ......... | H04L 12/40143 |
| 2018/0159681 | A1 * | 6/2018 | Molter .................. | H04L 9/3242 |
| 2018/0189103 | A1 * | 7/2018 | Teshler .................... | G06F 9/545 |
| 2018/0229739 | A1 * | 8/2018 | Imamoto ............... | B60W 50/14 |
| 2018/0309578 | A1 * | 10/2018 | Farrell ..................... | G06F 21/44 |
| 2019/0025818 | A1 * | 1/2019 | Mattingly ............. | H04L 9/3297 |
| 2019/0199524 | A1 * | 6/2019 | Takemori .................. | H04L 9/08 |

OTHER PUBLICATIONS

International Search Report and Written Opinion of PCT/EP2018/072023, dated Sep. 5, 2018.

* cited by examiner

DRIVER ASSISTANCE APPARATUS AND METHOD

CROSS-REFERENCE TO RELATED APPLICATIONS

This application is a 35 U.S.C. § 371 national phase of PCT International Application No. PCT/EP2018/072023, filed Aug. 14, 2018, which claims the benefit of priority under 35 U.S.C. § 119 to European Patent Application No. 17186405.1, filed Aug. 16, 2017, the contents of which are incorporated herein by reference in their entirety.

FIELD OF INVENTION

The present invention relates to a driver assistance apparatus and method, and more particularly a driver assistance apparatus and method for securing operating instructions of a driver assistance apparatus.

BACKGROUND

In order that accidents are avoided and driving laws are complied with, driving a vehicle requires concentration from the driver, often for prolonged periods. Lapses in concentration from the driver lead to increased risk of accidents and/or non-compliance with the law. Increasingly, driver assistance systems that are capable of performing an assistance function are fitted to the driver's vehicle (hereinafter referred to as the "ego vehicle"). For example, the assistance function may include relieving the driver of some of his/her driving duties, or may include monitoring the driver's performance in order that errors may be anticipated and/or avoided.

Alternatively, the assistance function may introduce some additional functionality not ordinarily available to a driver. Such additional functionality may allow the driver to have more information than they ordinarily would do, in order that they can perform a driving task more easily or safely. A rear-facing camera for example, which can provide a video feed to a driver when reversing, constitutes an example of such an additional functionality. In this example, the video feed allows the driver to reverse-park more easily and safely but is not actually necessarily monitoring the driver's performance or directly performing a task for them.

Driver assistance systems therefore mitigate risk for the driver of the ego vehicle, his/her passengers, and other road users. Ultimately, driver assistance functions will be developed to such an extent that they can control most or all aspects of driving an ego vehicle. In this case, the driver assistance system will be an autonomous driving system.

Driver assistance systems may include active devices, which are capable of actively intervening in the operation of the ego vehicle, for example by changing the speed of the ego vehicle. Driver assistance systems may alternatively, or additionally, include passive devices, which, for example, notify the driver of a particular driving situation so that the user can react to the notification. For example, the driver assistance system may make an audible signal when the ego vehicle deviates across a road marking unexpectedly. A given ego vehicle may include both passive and active systems.

In general, a driver assistance system may include at least one sensor. A particular sensor measures parameters that describe the ego vehicle and/or its surroundings. The data from sensor may be combined. The data from such a sensor is processed in order to draw conclusions based on the sensor measurements. The driver assistance system may trigger an interaction with the ego vehicle, or with the driver, based on the result of the conclusions. In the case of an autonomous driving system, substantially all driving functions are controlled by the system.

Examples of potential sensors used in driver assistance systems and autonomous driving systems include RADAR systems, LIDAR systems, cameras, inter-vehicle communications (or vehicle-to-vehicle communications), and vehicle-to-infrastructure communications.

A driver assistance system may be used to control a variety of different aspects of driving safety or driver monitoring. For example, ACC ("Adaptive Cruise Control") may use a RADAR or LIDAR system to monitor the distance between the ego vehicle and the vehicle immediately ahead on the road. Such a sensor is able to determine the distance to the vehicle ahead. The driver assistance system also knows, and can control, the velocity of the ego vehicle. The driver assistance system may control the speed of the ego vehicle in order to maintain a predefined safety condition relative to the vehicle ahead. For example, the driver assistance system may control speed to maintain a certain distance between the ego vehicle and the vehicle ahead. Alternatively, the driver assistance system may control speed to maintain a predetermined time-period between the vehicle ahead passing a point, and the ego vehicle passing the same point.

There are existing driving assistance systems that monitor the surroundings of the ego vehicle to identify the position of other vehicles and entities on or around the road on which the ego vehicle is travelling. By monitoring the surroundings, such a driver assistance system can maintain a situational awareness for the ego vehicle. This situational awareness can be used to notify the driver of potential hazards. For example, the ego vehicle changing lanes when a second vehicle is in a blind spot, or detecting a second vehicle cutting-in to the path of the ego vehicle, may be notified to a driver. The situational awareness may also be used as an input to an ACC system, for example.

It will be appreciated that an autonomous driving system may correspond generally to a more comprehensive driver assistance system. Thus, whilst the following discussion focuses on driver assistance systems, the intention is that the present invention is also readily applicable to an autonomous driving system.

Because a driver assistance system may perform a variety of safety-critical functionalities (safety of both the driver of the vehicle and others), it is important that any unauthorised interference with the driver assistance system and its operation is detected, and if necessary, acted upon.

In general, a driver assistance system includes an electronic control unit. The electronic control unit is effectively a computing device that can perform tasks according to operating instructions it can be thought of as the "brain of the driver assistance system." The operating instructions are generally stored on the electronic control unit, and may include software. The software may be compiled machine code, may be source code, or may be code that is compiled Just In Time (JIT). The key feature is that the operating instructions dictate the operation of the electronic control unit and therefore at least part of the driver assistance system. A single ego vehicle may have multiple electronic control units installed therein.

The operating instructions may be updated, for example to increase or change the functionality of the electronic control unit. Updates may take place "over the air", for example via a wireless connection to a communications network, and ultimately from a source of the update. The update may be sent wirelessly to the driver assistance system, whereupon the operating instructions of the electronic control unit are updated. The updates may alternatively be performed across a physical connection to the driver assistance system. Physical-connection updates may be performed when the vehicle is serviced, for example.

In any case, it is important that the updates to the operating instructions are verified as coming from a trusted source, and that the operating instructions have not been tampered with. If they are not verified, then there is potential for malicious alteration of the operating instructions. It is also important to verify that there have not been any inadvertent changes to the operating instructions. In either case, unverified changes to the operating instructions could result in incorrect or unreliable operation of the driver assistance system, which presents a serious safety concern. In the case of malicious changes to the operating instructions, an unscrupulous party may change the code so that it appears to a driver that the code is working properly, when in fact it is not and the operation of the driver assistance system is unsafe.

This above discussion focuses on updates to the operating instructions, but it is also important to verify an initial installation of the operating instructions. Such an initial installation may occur at the time of manufacture of the driver assistance system.

It is an object of the invention to provide an improved driver assistance apparatus and method of operating a driver assistance system, which seeks to address some or all of these issues.

SUMMARY OF PREFERRED EMBODIMENTS

According to a first aspect of an embodiment of the present invention, there is provided a driver assistance apparatus for installation in a motor vehicle, the apparatus including a safety electronic control unit, the safety electronic control unit including operating instructions stored thereon that dictate the operation of the safety electronic control unit, the safety electronic control unit further including: a verified hash storage for storing a verified hash value of at least a portion of the operating instructions; the safety electronic control unit being configured to implement a verification routine, the verification routine including: calculating, using a hash function, a test hash value of the at least a portion of the operating instructions; comparing the test hash value with the verified hash value, and if the test hash value is not equal to the verified hash value, performing a safety routine.

Preferably, the safety electronic control unit includes a program storage, the operating instructions being stored in the program storage.

Conveniently, the program storage and the verified hash storage are distinct hardware elements within the safety electronic control unit.

Advantageously, the safety routine includes at least one of: disabling the safety electronic control unit; notifying a user of the vehicle, and; notifying a party located remotely from the vehicle.

Preferably, the hash function includes a Secure Hash Algorithm ("SHA").

Conveniently, the hash function is an SHA-256 algorithm.

Advantageously, the verified hash value is encrypted on the verified hash storage.

Preferably, the apparatus further including at least one secondary electronic control unit having a respective set of secondary operating instructions, wherein a respective secondary verified hash value of at least a portion of the respective secondary operating instructions on the respective secondary electronic control unit is stored on the verified hash storage.

Conveniently, the safety electronic control unit being further configured to: request from each secondary electronic control unit a respective secondary test hash value, the respective secondary test hash value being calculated on the respective secondary electronic control unit for the at least a portion of the respective secondary operating instructions; comparing each respective secondary test hash value with the corresponding secondary verified hash value, and if the respective secondary test hash value is not equal to the corresponding secondary verified hash value, performing a respective secondary safety routine.

Advantageously, the respective secondary safety routine includes ignoring by the safety electronic control unit any further inbound communication from the respective secondary electronic control unit.

Preferably, the respective secondary safety routine includes at least one of: disabling the respective secondary electronic control unit; notifying a user of the vehicle, and; notifying a party located remotely from the vehicle.

According to a second aspect of an embodiment of the present invention, there is provided a method of verifying the operation of a driver assistance apparatus for installation in a motor vehicle, the apparatus including a safety electronic control unit having operating instructions stored thereon that dictate the operation of the safety electronic control unit, the method including: calculating, using a hash function, a test hash value of at least a portion of the operating instructions; comparing the test hash value with a verified hash value, the verified hash value having been determined for at least a portion of verified operating instructions; and if the test hash value is not equal to the verified hash value, performing a safety routine.

BRIEF DESCRIPTION OF THE DRAWINGS

Features of the first aspect of the invention may of course be applied to the second aspect of the invention.

So that the invention may be more readily understood, and so that further features thereof may be appreciated, embodiments of the invention will now be described by way of example with reference to the accompanying drawings in which.

DETAILED DESCRIPTION

Figure 1:
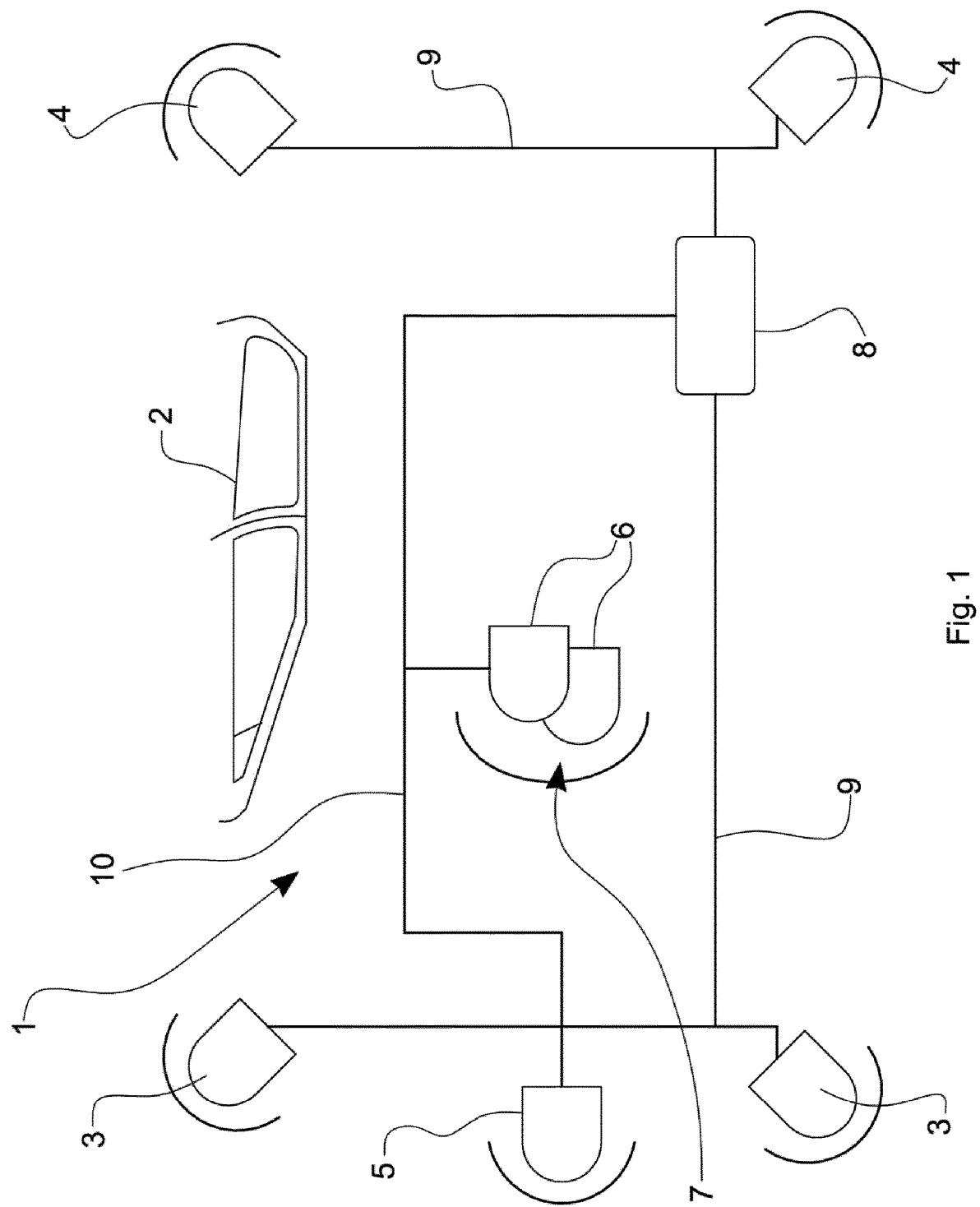
FIG. 1 shows a vehicle including an example driver assistance system.

Turning now to consider FIG. 1 in more detail, there is illustrated a schematic representation of an exemplary driver assistance system 1 installed in an ego vehicle 2 (only one side panel of which is denoted in FIG. 1 to indicate the vehicle's orientation). The driver assistance system 1 may include a number of different types of sensor mounted at appropriate positions on the ego vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed long-range radar ("LRR") sensor 5 mounted centrally at the front of the vehicle 2, and a pair of generally forwardly directed optical sensors 6 (cameras) forming part of a stereo vision system ("SVS") 7 which may be mounted, for example, in the region of the upper edge of the vehicle's windscreen. The various sensors 3-6 are operatively connected to a central electronic control system which is typically provided in the form of an integrated electronic control unit 8 mounted at a convenient location within the vehicle. In the particular arrangement illustrated, the front and rear MRR sensors 3, 4 are connected to the electronic control unit 8 via a conventional Controller Area Network ("CAN") bus 9, and the LRR sensor 5 and the sensors of the SVS 7 are connected to the electronic control unit 8 via a faster FlexRay serial bus 9, also of a type known per se.

Collectively, and under the control of the electronic control unit 8, the various sensors 3-6 can be used to provide a variety of different types of driver assistance functionalities such as, for example: blind spot monitoring; adaptive cruise control; collision prevention assist; lane departure protection; and rear collision mitigation. Similar sensors may be used in an autonomous driving system.

The system may also include at least one secondary electronic control unit. The or each secondary electronic control unit may communicate with the electronic control unit 8 via the CAN bus or the FlexRay serial bus 9. Secondary electronic control units are discussed in more detail below.

Figure 2:
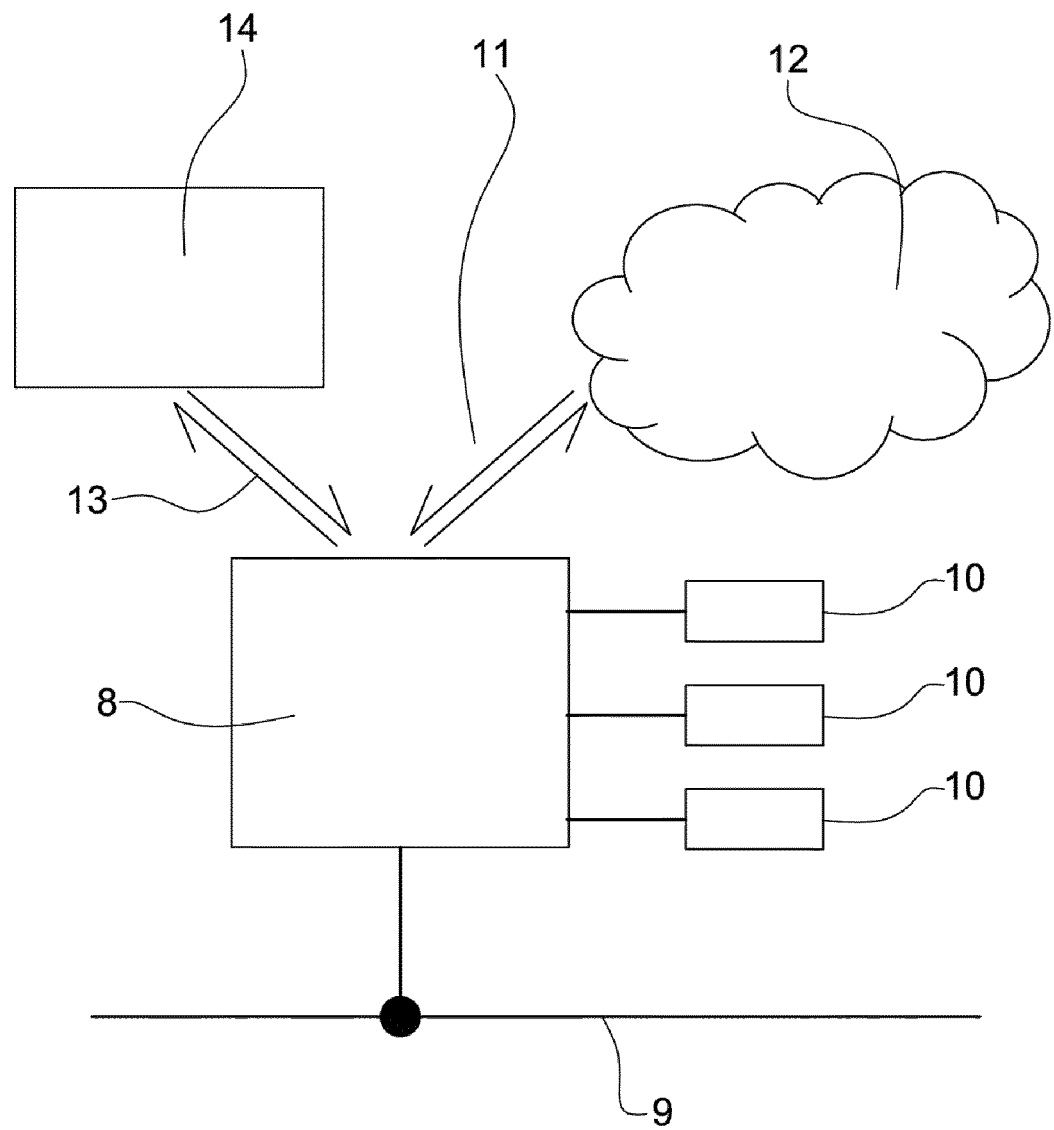
FIG. 2 shows a schematic of a safety electronic control unit included in a driver assistance system.

An example of the apparatus in accordance with the present invention is shown in FIG. 2. The system includes an electronic control unit 8 of the type shown in FIG. 1. The electronic control unit 8 is a so-called safety or primary electronic control unit. The safety electronic control unit 8 is connected to an ego vehicle communication network 9 within the ego vehicle 2. The ego vehicle communication network 9 may be a CAN bus or a FlexRay system, for example. A particular electronic control unit 8 may be connected to more than one such network, which may not be of the same types. The safety electronic control unit 8 may communicate with other electronic control units in the ego vehicle via the ego vehicle communication network 9.

The safety electronic control unit 8 is connected to at least one sensor 10. In the example shown in FIG. 2, three sensors 10 are connected to the safety electronic control unit 8, although this number of sensors should not be considered limiting. The connections of each of the sensors 10 to the safety electronic control unit 8 may be wired or wireless. The sensor connections may also be via the ego vehicle communication network 9. The connection between each sensor 10 and the safety electronic control unit 8 may be a two-way connection that is, the safety electronic control unit 8 may receive data from the sensor 10 and the safety electronic control unit 8 may send data and/or commands to the sensors 10. The sensors 10 may be providing information concerning the state of the ego vehicle itself or the state of the surrounding environment. The sensors 10 may also provide some data reduction capability that is determined parameters may be calculated at the sensors 10 and sent to the safety electronic control unit 8 from the sensors 10, rather than (or in addition to) the sensors 10 sending raw measurements performed by the sensors 10 to the safety electronic control unit 8.

The safety electronic control unit 8 is also capable of wireless communication with the internet across a 2-way internet communication link 11. The internet includes a cloud computing capability 12, to which the safety electronic control unit 8 may offload processing tasks. The internet communication link 11 may include a connection to a mobile telephone communications network, for example. The safety electronic control unit 8 may send processing tasks to the cloud 12 over the internet communication link 11, where the processing task is performed in the cloud 12, before the results of the processing task are sent back to the safety electronic control unit 8 over the internet communication link 11.

The internet communication link 11 may also provide access to data that is not available immediately to the electronic control unit 8. Such data may include map data, for example.

The internet communication link 11 also provides a pathway for over-the-air update/installation of operating instructions onto the safety electronic control unit 8. The operating instructions are discussed in more detail below.

The safety electronic control unit 8 also has a second wireless communication link 13, which provides access to a distributed functionality 14 external to the ego vehicle. The distributed functionality may include Vehicle-to-Vehicle communications, or Vehicle-to-Infrastructure communications. These may permit driver assistance functionality and/or autonomous driving functionalities in which information can be shared with the ego vehicle, or to which the ego vehicle can share information across the second wireless communication link 13.

Figure 3:
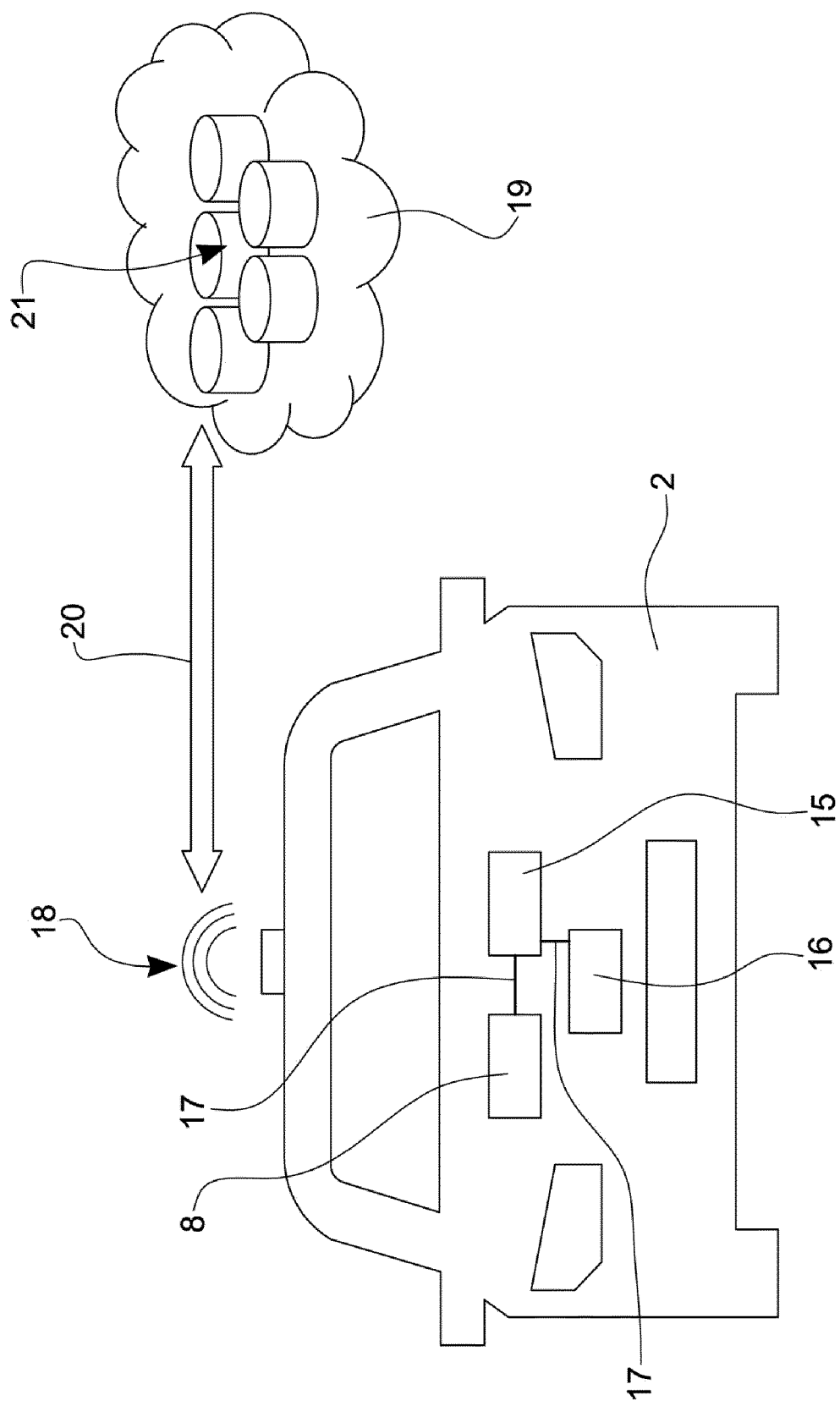
FIG. 3 shows a schematic of the safety electronic control unit of FIG. 2 located in a vehicle.

FIG. 3 shows a schematic end view of the ego vehicle 2. The ego vehicle 2 includes a safety electronic control unit 8. Also included in the ego vehicle 2 are two secondary electronic control units 15, 16. The safety electronic control unit 8 and the secondary electronic control units 15, 16 are interconnected via an in-vehicle communication network 17. The in-vehicle communication network 17 may be a CAN bus, a FlexRay bus, a Local Interconnect Network (LIN) or an Ethernet network, for example.

The ego vehicle 2 also includes a wireless communication transceiver 18, which is operatively connected to the electronic control unit 8 (although that connection is not shown in FIG. 3). The wireless communication transceiver 18 is configured for communication with a network 19, via a two-way wireless communication link 20. The network 19 includes storage of operating instructions, and/or operating instruction updates in at least one storage location 21.

Figure 4:
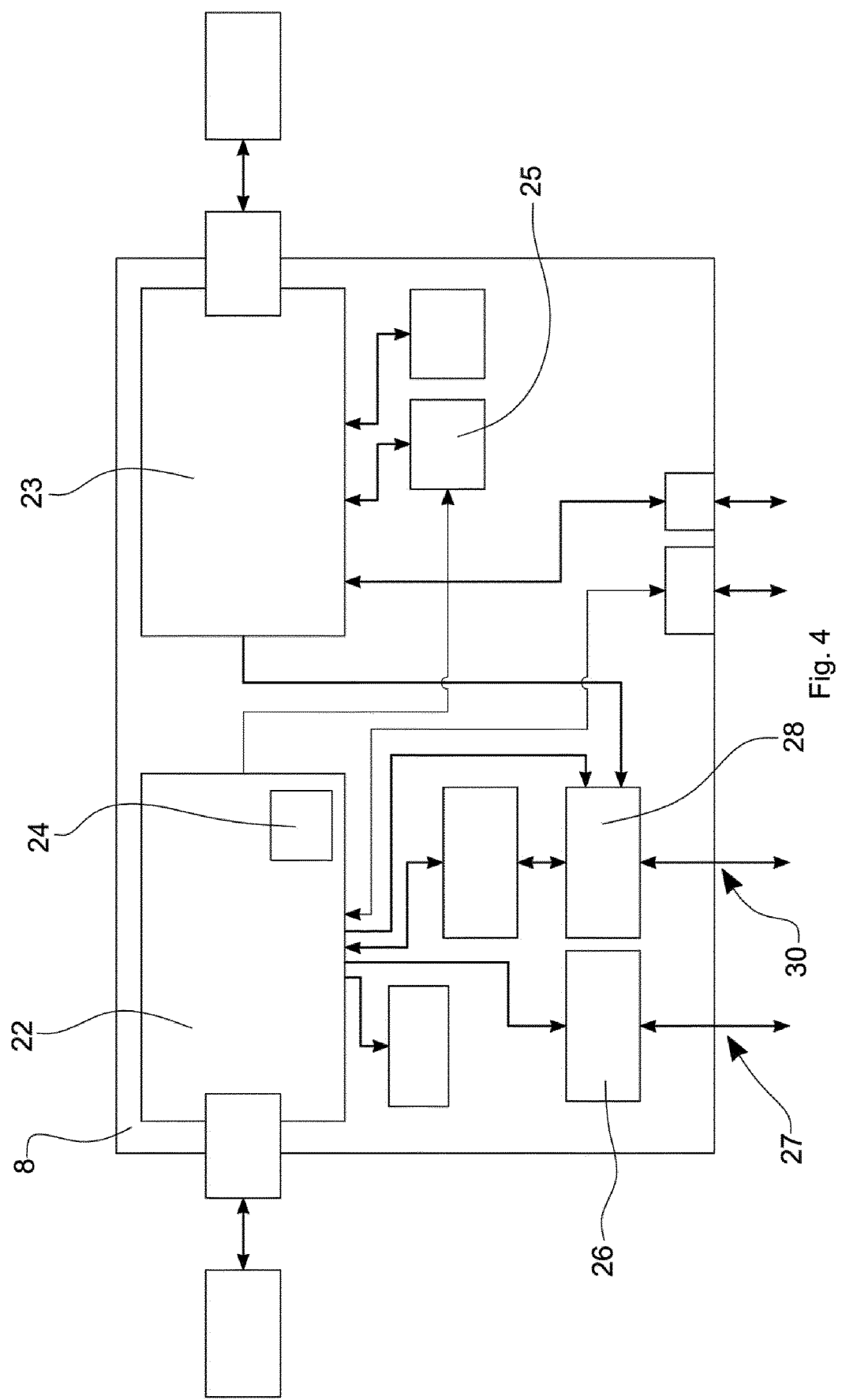
FIG. 4 shows an example architecture of the safety electronic control unit of FIGS. 2 and 3.

FIG. 4 illustrates an example architecture of the safety electronic control unit 8. The safety electronic control unit 8 includes a safety microcontroller unit (MCU) 22 and a performance System on a Chip (SoC) 23. The safety MCU 22 includes a program storage 24. The program storage 24 is internal to the safety MCU 22. The program storage 24 may be flash memory, for example PFLASH. The operating instructions for the operation of the safety MCU 22 are stored on the program storage 24.

The safety electronic control unit 8 also includes a verified hash storage 25. The verified hash storage 25 is external to the safety MCU 22, but internal to the safety electronic control unit 8. The verified hash storage 25 may be flash memory, for example PFLASH. A verified hash value of the operating instructions (which are stored on the program storage 24) is stored in the verified hash storage 25. The verified hash value may have been generated for the data corresponding to a portion of the operating instructions or for data corresponding to the whole of the operating instructions. The verified hash value is generated by a hash function at the time that the operating instructions were produced in a verified and trusted form by the manufacturer (i.e. a trusted source). The verified hash stored on the verified hash storage 25 is encrypted.

The hash value is calculated by a hash value calculation unit, the hash value calculation unit implementing the hash function. In the embodiment of FIG. 4, the hash value calculation unit is the performance System on a Chip (SoC) 23. The SoC 23 implements the hash function that calculates a test hash value. The test hash value may be generated for the data corresponding to a portion of the operating instructions or data corresponding to the whole of the operating instructions as the input data of the hash function.

In general, a hash function (or hash algorithm) is a computational routine that, given input data, generates a hash value (alternatively known as hash code, digest, or hash) of the input data. A hash function is a mathematical algorithm that maps input data of arbitrary size to a bit string of a fixed size (the hash value). Hash functions per se are known, and will not be described in detail here. For a first input data the hash function generates a first hash value. If the first input data is changed, even by only a tiny amount, the probability is extremely high that the hash function (when run on the input data again) will generate a second hash value that is different to the first hash value. Thus, by looking at the hash values of a piece of input data generated by the same hash function at two different times, it is possible to determine with an extremely high degree of certainty whether or not the input data has changed, even by a small amount. It is noted that the underlying meaning or contents of the input data is irrelevant for the purposes of a hash function. The hash function operates on the data at a binary level.

As mentioned, the performance SoC 23 implements the hash function. Thus, the safety electronic control unit 8 is configured to calculate a test hash value for the operating instructions (or a portion thereof). As discussed, the input data to a hash function is simply considered as binary input data. The meaning of the operating instructions in this case is neither important, known, nor used by the hash function.

In the present embodiment, the hash function is an SHA-2 algorithm, which is a Secure Hash Algorithm second generation. The particular algorithm used in the described embodiment generates a 256-bit hash value, and is known as SHA-256. However, the present invention should not be limited to SHA-256 or to SHA-2 algorithms. It will be apparent to the skilled person in light of this disclosure that hash functions in general are suitable for use in the present invention.

The test hash value generated from the operating instructions in the program storage 24 is compared to the verified hash value stored in the verified hash storage 25. The verified hash value stored in the verified hash storage 25 may be encrypted. If the verified hash value on the verified hash storage 25 is encrypted, then it must be decrypted before the comparison can be made.

There are two possible outcomes of the comparison: either, i) the test hash value and the verified hash value are identical to one another, or ii) the test hash value and the verified hash value are different and thus not identical to one another. Depending on the outcome of the comparison, the safety electronic control unit 8 may be configured to act differently.

If the verified hash value and the test hash value are identical, then the binary content of the operating instructions on the program storage 24 is overwhelmingly likely to be identical to the binary content of the verified operating instructions that were used to generate the verified hash value. If the binary content is identical, then it follows that the substance of the operating instructions (i.e. the operation of the electronic control unit that those instructions dictate) on the program storage 24 are identical to the verified operating instructions. In the event that the test hash value and the verified hash value are identical, then the operating instructions on the program storage have not been tampered with (i.e. they have not been changed relative to the verified operating instructions).

If the verified hash value and the test hash value are not identical (i.e. they are different), then the binary content of the operating instructions on the program storage 24 is overwhelmingly likely to be different to the binary content of the verified operating instructions that were used to generate the verified hash value. If the binary content is different, then it follows that the substance of the operating instructions (i.e. the operation of the safety electronic control unit that those instructions dictate) on the program storage 24 is different from the verified operating instructions. Accordingly, in the event that the test hash value and the verified hash value are not identical, then the operating instructions on the program storage may have been tampered with. At the least, they have been changed relative to the verified operating instructions, which may have been malicious.

In any case, if the verified hash value and the test hash value are not identical, the safety electronic control unit 8 may implement a safety routine. The safety routine may include a variety of actions. The action taken during the safety routine may depend on a level of danger presented by a change to the operating instructions on the program storage 24.

For example, the safety routine may include:

Disabling the safety electronic control unit 8 entirely, so that it cannot function;

Notifying a user of the vehicle. Such a notification may include notifying the user of a potential problem with the driver assistance system, or notifying the user that the driver assistance system (or part of it) has been disabled in light of an error;

Notifying a remotely located party of the unverified operating instructions on the program storage. The remotely located party may be the manufacturer of the driver assistance system, or the manufacturer of the vehicle, for example.

The safety routine may include any or all of these actions.

The verification sequence (i.e. the calculation of the test hash value, the comparison of the test hash value and the verified hash value, and the potential safety routine) may be performed as part of a boot up routine/sequence of the safety electronic control unit 8. Of course, however, the verification sequence could be performed at any time.

The safety electronic control unit 8 may be connected to one or more secondary electronic control units also located within the vehicle see FIG. 3, which shows two secondary electronic control units 15, 16 connected to the safety electronic control unit via in-vehicle communication network 17.

The electronic control unit 8 of FIG. 4 has a COM transceiver 26, which provides for a first in-vehicle communication network connection 27. The first in-vehicle communication network connection 27 may be to a CAN Bus, LIN, or a FlexRay network.

The safety electronic control unit 8 of FIG. 4 also has an Ethernet switch 28, which provides for a second in-vehicle communication network connection 30. The second in-vehicle communication network connection 30 is an Ethernet connection.

The connection(s) between the safety electronic control unit 8 and the secondary electronic control units 15, 16 may be via either the first or second in-vehicle communication network connections 27, 30. Both first and second in-vehicle communication network connections 27, 30 may be utilised. That is, the safety electronic control unit 8 may be connected to one or more secondary electronic control units via the first in-vehicle communication network connection 27, and to one or more different secondary electronic control units via the second in-vehicle communication network connection 30.

Figure 5:
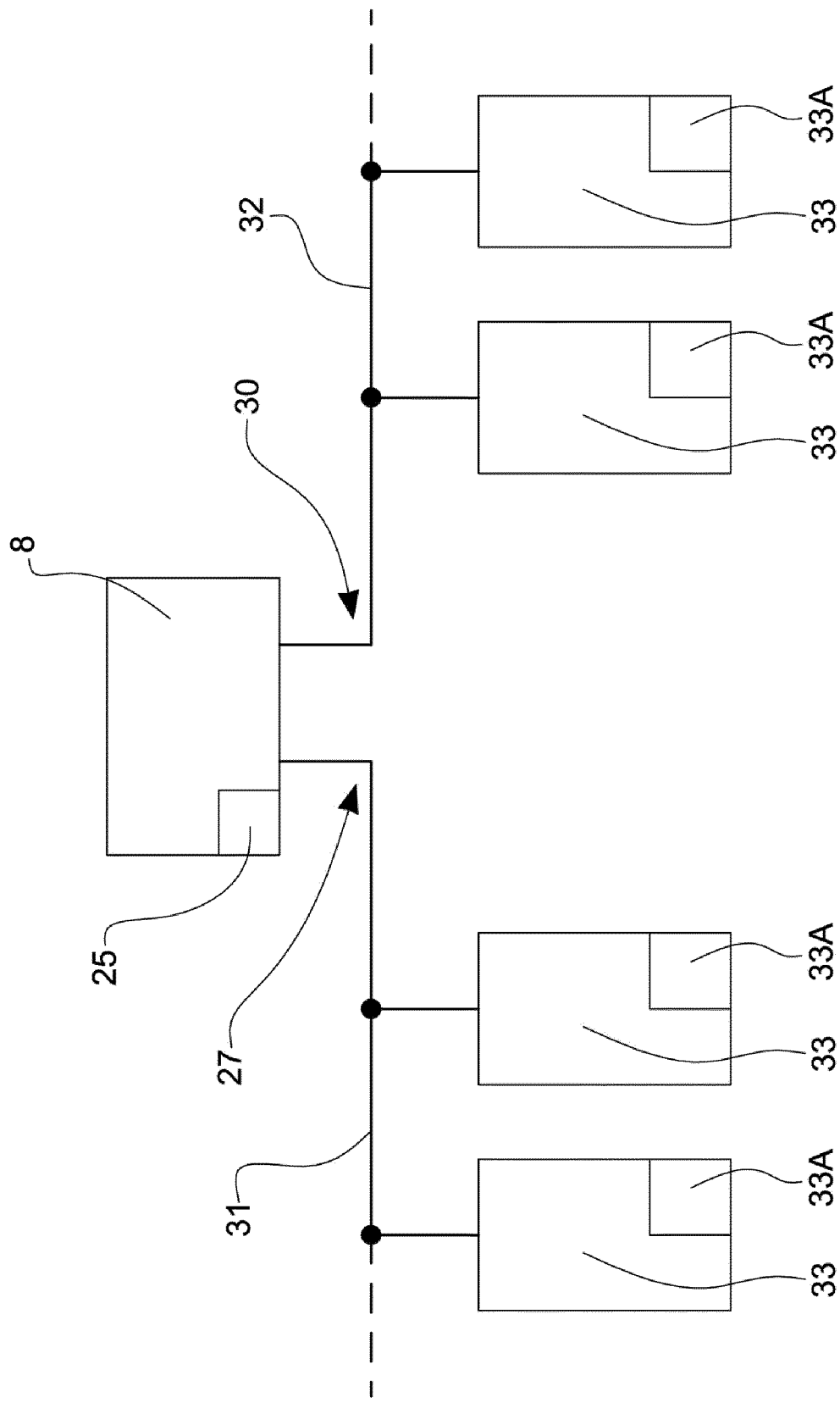
FIG. 5 shows the safety electronic control unit of FIGS. 2 and 3, networked with four secondary electronic control units.

FIG. 5 illustrates the safety electronic control unit 8 in a network of electronic control units in an ego vehicle. As described in respect of FIG. 4, the safety electronic control unit 8 has first and second in-vehicle communication network connections 27, 30. The first in-vehicle communication network connection 27 connects to a first in-vehicle communication network 31. The second in-vehicle communication network connection 30 connects to a second in-vehicle communication network 32.

Each of four secondary electronic control units 33 is shown connected to either the first or second in-vehicle communications network 27, 30. Of course, there may be greater or fewer than four secondary electronic control units; four is used only as an example to demonstrate the principle.

Each secondary electronic control unit 33 includes a secondary program storage 33A in which the operating instructions for that secondary electronic control unit 33 are stored. Each secondary electronic control unit 33 is configured to implement a hash function for calculating a respective secondary test hash value for that secondary electronic control unit 33. The respective secondary test hash value may be generated for a portion of the operating instructions in the respective secondary program storage 33A, or for the whole of the operating instructions as the input data of the hash function on the secondary electronic control unit 33.

After each secondary electronic control unit 33 has generated its respective secondary test hash value, it sends that secondary test hash value to the safety electronic control unit 8 via the respective in-vehicle communication network 27, 30 to which it is connected. The secondary electronic control unit 8 then compares each received secondary test hash value with a secondary verified hash value for the respective secondary electronic control unit 33, which is stored on the safety electronic control unit 8. The secondary verified hash values are stored in the verified hash storage 25, which is part of the safety electronic control unit 8 (see FIG. 4). Thus, the verified hash value storage 25 on the safety electronic control unit 8 stores a collection of verified hash values corresponding to (at least) the secondary electronic control units 33 to which the safety electronic control unit 8 is networked.

The safety electronic control unit 8 therefore performs a check of the operating instructions for each of the secondary electronic control units 33, as stored in corresponding secondary program storage 33A. If the safety electronic control unit 8 finds that the secondary test hash value is not identical to the corresponding secondary verified hash value, then the safety electronic control unit 8 may run a secondary safety routine.

The secondary safety routine may include a variety of actions. The action taken may depend on a level of danger presented by a change to the operating instructions on the program storage 33A of the secondary electronic control unit 33.

For example, the safety routine may include:
Disabling the secondary electronic control unit 33 entirely, so that it cannot function;
Ignoring any communications from the secondary electronic control unit 33 with non-identical hash values
Notifying a user of the vehicle.

Such a notification may include notifying the user of a potential problem with the driver assistance system, or with the specific part of the driver assistance system that is controlled by the secondary electronic control unit 33 with non-identical hash values or notifying the user that the driver assistance system (or part of it) has been disabled.

Notifying a remotely located party of the unverified operating instructions on the secondary program storage 33A of the secondary electronic control unit 33. The remotely located party may be the manufacturer of the driver assistance system, the manufacturer of the vehicle, or the manufacturer of the secondary electronic control unit 33, for example.

The secondary safety routine may include any or all of these actions.

When a verified source updates the operating instructions on the safety
electronic control unit 8 or on one or more of the secondary electronic control units 33, the corresponding verified hash value stored in the verified hash storage is also updated.

The verified source may for example, use the network 19. The network 19 may include a decentralised blockchain in which versions of the operating instructions are stored. The decentralised blockchain includes a plurality of nodes (corresponding to storage locations). Each node of the decentralised blockchain contains a secure copy of the blockchain (in the absence of a change to any of said copies). In other words, each of the nodes has a copy of the blockchain; together the nodes form the distributed blockchain.

Each node includes a copy of the blockchain. Together the blocks form a local copy of the blockchain (local to the node). Each block includes a data section. Each block also includes block metadata. Each block may include a version of the operating instructions and a corresponding verified hash value of those operating instructions.

Thus, future verifications of updated operating instructions sourced from a node of the distributed blockchain, involving the comparison to the verified hash value, are possible.

The features disclosed in the foregoing description, or in the following claims, or in the accompanying drawings, expressed in their specific forms or in terms of a for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A driver assistance apparatus for installation in a motor vehicle, the apparatus comprising, a safety electronic control unit, the safety electronic control unit comprising a program storage memory having operating instructions stored thereon, the operating instructions dictating the operation of the safety electronic control unit, wherein the operating instructions contain driver assistance operating instructions, the safety electronic control unit further including:
a verified hash storage memory storing a verified hash value of at least a portion of the operating instructions, wherein the verified hash value is encrypted on the verified hash storage memory, and wherein the verified hash value is generated by a hash function performed by a trusted source at a time of production of the operating instructions;
the safety electronic control unit being configured to implement a verification routine, the verification routine including:
calculating, using a hash function, a test hash value of the at least a portion of the operating instructions;
comparing the test hash value with the verified hash value to verify that the operating instructions have not been altered, and if the test hash value is not equal to the verified hash value, performing a safety routine, and
wherein comparing the test hash value with a verified hash value includes decrypting the verified hash value.

2. The driver assistance apparatus according to claim 1, wherein the program storage memory and the verified hash storage memory are distinct hardware elements within the safety electronic control unit.

3. The driver assistance apparatus according to claim 1 further comprising, the safety routine includes at least one of:
disabling the safety electronic control unit;
notifying a user of the vehicle, and;
notifying a party located remotely from the vehicle.

4. The driver assistance apparatus according to claim 1, further comprising, the hash function includes a Secure Hash Algorithm.

5. The driver assistance apparatus according to claim 4 further comprising, the hash function is an SHA-256 algorithm.

6. The driver assistance apparatus according to claim 1, the apparatus further comprising, at least one secondary electronic control unit; having a respective set of secondary operating instructions,
wherein a respective secondary verified hash value of at least a portion of the respective secondary operating instructions on the respective secondary electronic control unit is stored on the verified hash storage memory.

7. The driver assistance apparatus according to claim 6, the safety electronic control unit being further configured to:
request from each secondary electronic control unit a respective secondary test hash value, the respective secondary test hash value being calculated on the respective secondary electronic control unit for the at least a portion of the respective secondary operating instructions;
comparing each respective secondary test hash value with the corresponding secondary verified hash value, and
if the respective secondary test hash value is not equal to the corresponding secondary verified hash value, performing a respective secondary safety routine.

8. The driver assistance apparatus according to claim 7 further comprising, the respective secondary safety routine includes ignoring by the safety electronic control unit any further inbound communication from the respective secondary electronic control unit.

9. The driver assistance apparatus according to claim 7 further comprising, the respective secondary safety routine includes at least one of:
disabling the respective secondary electronic control unit;
notifying a user of the vehicle, and;
notifying a party located remotely from the vehicle.

10. A method of verifying the operation of a driver assistance apparatus for installation in a motor vehicle, the apparatus including a safety electronic control unit having operating instructions stored thereon that dictate the operation of the safety electronic control unit, wherein the operating instructions contain driver assistance operating instructions, the method including:
calculating, using a hash function performed by a trusted source at a time of production of the operating instructions, a test hash value of at least a portion of the operating instructions;
decrypting, by the safety electronic control unit, a verified hash value stored on a verified hash storage memory;
comparing the test hash value with the verified hash value to verify that the operating instructions have not been altered, the verified hash value having been determined for at least a portion of verified operating instructions; and
if the test hash value is not equal to the verified hash value, performing a safety routine.

\* \* \* \* \*